United States Patent Office
2,713,722
Patented July 26, 1955

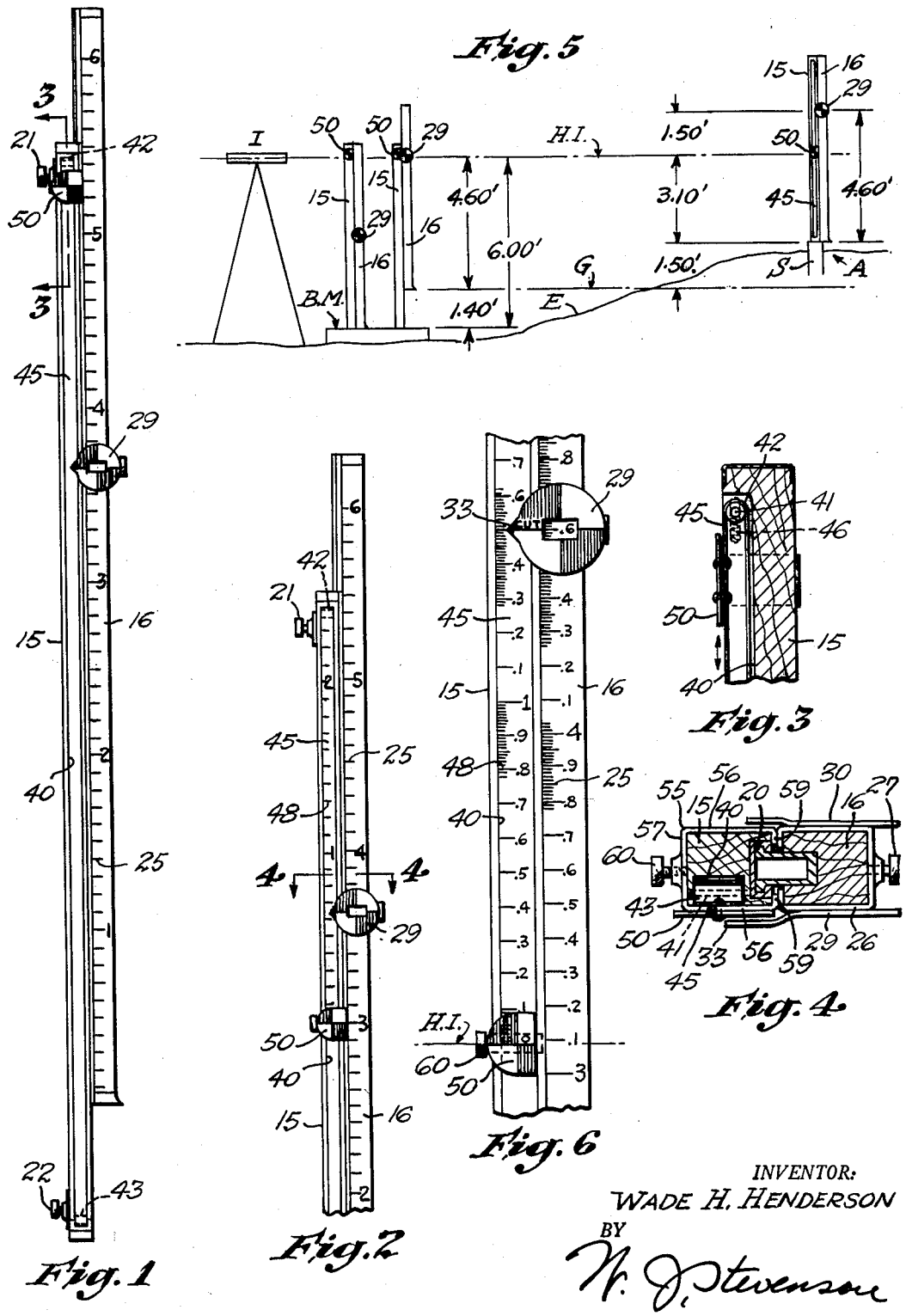

2,713,722
GRADE SET AND LEVEL ROD WITH CUT INDICATOR

Wade H. Henderson, Norwalk, Calif.

Application January 27, 1954, Serial No. 406,421

6 Claims. (Cl. 33—74)

This invention relates generally to the civil engineering art and is concerned with an engineering rod employed for setting grades and levels, the present application being a continuation-in-part of my pending application, Serial No. 356,576, entitled Combination Grade Set and Level Rod.

My pending application, referred to above, disclosed an engineering rod composed of two relatively adjustable vertical sections slidably arranged in side-by-side relation and a double-face target adjustable longitudinally along one of said sections, the latter section having a usual linear scale on its front or "grade-set" face with which the target is adapted to register as it is slid vertically therealong. The other section serves as a support for the vertically adjustable section and has no scale on its front, grade-set face. The opposite "level" faces of the two sections have linear scales with which the target is registrable. The improved engineering rod is designed for use primarily in setting "plus" and "minus" grades on vertical surfaces, at which time the front grade-set face of the rod is employed, and in setting grades for fill sections of earthwork, at which time the reverse or level face of the rod is used, typical examples of the use of the rod being outlined in said pending application and therefore not described in detail herein.

In setting grades for earthwork, it frequently occurs that the section of ground under consideration must be excavated to lower its surface to a desired grade, such a section being commonly referred to as a "cut" section, as distinguished from a "fill" section where earth must be added to elevate the surface of a section to the new grade. When using conventional level rods, the target is set upon the rod at a distance above the lower end thereof which corresponds to the distance from the H. I. (height of instrument) downwardly to the new elevation or grade to be set. The rodman supports the rod in vertical position upon a selected section where a grade is to be set. The instrument man observes the rod and notes that the reading is less than the grade rod setting. He then subtracts the reading from the H. I. reading at the target, the difference being the amount of "cut" necessary at that point. In another procedure, the rodman calls or otherwise signals the last-found reading to the instrument man who then calculates the amount of cut necessary. In either case, the amount of cut is indicated upon a stake driven into the earth. This method of setting a grade for earthwork is repeated at selected points spaced throughout the area of the ground to be graded. It is to be noted at this point that when a "fill" section is indicated, the target is moved upwardly into register with the H. I. and the difference between the first and second settings of the target represents the height of fill necessary to bring the section up to the new grade. In the rod disclosed in my pending application, the height of fill is readily determined by utilizing the rear or level face of the rod so that calculations are unnecessary and the possibility of error, which frequently occurs due to inaccurate figuring or misunderstanding between the rodman and instrument man when a conventional rod is utilized, is practically eliminated.

It is an important object of the present invention to provide an engineering rod of the general character disclosed in my pending application and one which is more versatile in that it includes a self-calculating means by which the amount of cut necessary to lower the earth to a selected grade can be readily determined by the rodman, without calculations on his part, and then marked on a stake driven into the ground. By this improved engineering rod, then, the procedure of establishing a grade for earthwork of large area is greatly expedited and the engineering costs involved are accordingly minimized.

Another object of the invention is to provide a rod, of the character referred to, which involves a pair of vertical rod sections arranged in side-by-side relation, a first rod section serving as a support for a second rod section which is slidably adjustable along the first section to register a main target, adjustable vertically on said second rod section, with the H. I. In accordance with the present invention, the first-mentioned rod section carries an endless graduated band or tape extending around rollers at the upper and lower ends of this section, the tape carrying an auxiliary target at its "zero" graduation. By this improved structure, after the rod has been set up at a selected point on the ground and it is apparent that a cut is necessary, the auxiliary target is lowered into alignment with the H. I., at which time the amount of cut is automatically indicated by a pointer or indicator finger on the main target with which the graduations of the endless tape register, the distance between the centers of the two targets designating the depth of cut necessary to lower the ground at this section of earthwork to the desired grade. Thus, the depth of cut is ascertainable immediately by simply reading the mark of the endless tape indicated by the pointer of the main target.

Another object of the invention is to provide an engineering rod embodying a self-calculating cut attachment in which the endless band or scale is disposed entirely within a longitudinal groove provided in the face of the rod section and thus protected against damage, and in which the main and auxiliary targets are so constructed and arranged that they readily pass each other, one in front of the other, with sufficient clearance therebetween to avoid interference.

Another object is to provide a rod of the type indicated which includes means for clamping the auxiliary target in different positions of vertical adjustment.

A further object of the invention is to provide a rod, of the class referred to, which is of simple construction and economical to produce either from wood or lightweight metal, one which is strong and durable and made with precision so as to be extremely accurate in use, and one which is self-calculating to avoid errors which frequently occur when conventional rods are employed.

Further objects of the invention will appear from the following description and from the drawing, which is for the purpose of illustration only, and in which:

Fig. 1 is a front face view of my improved engineers' rod, showing the "cut" calculating means embodied thereon and with the auxiliary or "cut" target in inoperative position;

Fig. 2 is a view similar to Fig. 1, showing the cut calculating tape and its auxiliary target moved downwardly to a typical operative position;

Fig. 3 is an enlarged longitudinal sectional view through the rod section which carries the cut calculator means, taken on line 3—3 of Fig. 2 and showing the endless tape and the mounting means therefor;

Fig. 4 is an enlarged cross-sectional view, taken on line 4—4 of Fig. 2;

Fig. 5 is a diagrammatic view, illustrating the method of applying the cut calculating means to use; and Fig. 6 is an enlarged, fragmentary front view of a portion of the rod, with the main target, cut indicator tape and auxiliary tape assuming the positions illustrated at the right in Fig. 5.

Referring to the drawing in detail, the present invention is concerned with a combined grade-set and level rod having a pair of normally vertical rod sections 15 and 16 arranged in side-by-side relation and having coplanar front faces 17 and 18. As shown in Fig. 4, the rod sections 15 and 16 have interengaging, longitudinally extending tongue-and-groove means 20 by which they are retained in assembled relation while being permitted to slide vertically, relative to each other, this connection being disclosed in detail in my pending application, Serial No. 356,576. Clamping means, indicated generally at 21 and 22, serve to releasably lock the rod sections together in selected positions of adjustment, such clamping means not being herein described in detail since they are disclosed in said pending application.

The rod section 16, hereinafter referred to as the grade-set rod section, may be regarded as the movable section while the first-mentioned section 15 may be considered a stationary section for supporting the section 16.

The grade-set rod section 16 is provided with a linear scale 25 on its front face, this scale having graduations in increments of feet, tenths and hundredths of feet with the zero mark located at the extreme lower end of the rod. A U-shaped target carrier 26 embraces and is slidable longitudinally of the rod section 16, the carrier having a clamping screw 27 by which it can be releasably locked in any selected position along the rod. The carrier mounts a pair of disc-like, front and rear targets 29 and 30 which are slidable along the front and rear faces of the rod section 16 with their horizontal centerlines registerable respectively with the scale 25 and another scale (not shown) on the rear face of this rod section, the front disc 29 being a "grade-set" target and the rear disc 30 a "level" target, as will be apparent from my pending application. The target 29 has a pointer 33 which projects laterally to overlie slightly the rod section 15.

As thus far described, the grade-set rod 15, 16 is adapted for use in establishing grades on vertical surfaces. To accomplish this, the grade to be established or marked is calculated downwardly (in the case of a "minus" grade) from the line of sight or height of the grade-set instrument (the H. I.) and the target 29 is fixed on the rod section 16 at the corresponding graduation of the scale 25. The rod 15, 16 is next set up against the vertical surface with the lower end of the rod section 15 resting upon the ground or floor, after which the rod section 16 is moved upwardly or downwardly by the rodman, as signaled by the instrument man, to align the target 29 with the H. I. At this time, the lower "zero" end of the grade-set section 16 is located at the desired grade and the rodman simply places a mark on the vertical surface at said zero point. To mark "plus" grades on vertical surfaces, the entire rod is simply inverted, after which the same procedure is carried out. By this novel grade-set rod structure, the setting of grades or elevations is greatly expedited and the procedure is carried out with far greater convenience and precision than heretofore possible when the conventional Philadelphia rod is employed.

In order to provide even greater versatility, the rod is designed, according to the present invention, to facilitate the grading or leveling of earthwork and to establish the grade at selected areas or sections without calculation on the part of either the instrument man or rodman.

Referring to the drawing, the reference numeral 40 designates a longitudinal groove formed in the front face 17 of the rod section 15, this groove extending throughout nearly the entire length of the rod section. Extending across the groove 40 at the upper and lower ends thereof are transverse pins or axles 41 upon which rollers 42 and 43 are rotatable. Extending around the rollers is an endless metal tape 45, the rollers being so located and of such diameter as to locate one portion or stretch of the tape substantially flush with the front face 17 of the rod section 15. As shown, spring means 46 may be employed for urging the roller 42 away from the roller 43 so as to maintain the tape 45 taut.

The endless tape 45 is provided with a scale 48 having linear graduations representing feet, tenths and hundredths of feet, the scale being located on the portion of the tape which may be viewed from the front of the rod, that is, the portion which may be rotated into coplanar relation with the face 17 when the tape is applied to use.

Riveted or otherwise secured to the tape 45, with its horizontal centerline coinciding with the "zero" mark of the scale 48, is an auxiliary target 50. Preferably, the auxiliary target 50 is of a different configuration than the main target 29 so as to avoid confusion or lack of identity therebetween. As shown in Fig. 4, the adjacent portions of the targets 29 and 50 are offset slightly to allow them to pass by each other.

The auxiliary target 50 is additionally secured to a U-shaped carrier 55, the sides 56 and connecting web 57 of which embrace the front and rear sides and the outer vertical edge of the rod section 15. The carrier 55 has inwardly directed flanges 59 which engage the inner vertical edge of the rod section 15. A clamping screw 60 is threaded through a hole in the web 57 and may be set up against the outer vertical edge of the section 15 to retain the carrier 55 and the target 50 connected thereto in selected positions of vertical adjustment along this rod section.

The improved rod having now been described in detail, a brief outline of the method of applying it to use will now be given, reference being made to Fig. 5 of the drawing. Assuming, for example, that a section of earth E is to be graded, the civil engineer's instrument I is first set up at a selected point and accurately leveled. The rod 15, 16 is next placed upon a bench mark (B. M.) of known grade. The height of the instrument sight (H. I.) above the (B. M.) is determined by sighting the graduation on the scale 25 of the rod section 16. With the H. I. thus determined, the distance downwardly from the H. I. to the new grade G is calculated and the main target 29 is set at this mark on the scale 25. For example, if the H. I. is 6.00' above the B. M., and the new grade G is 1.40' above the B. M., then the distance downwardly from the H. I. to the new grade G is 4.60' and the main target 29 is moved to a position along the rod section 16 wherein its centerline registers with the 4.60' mark on the scale 25. The rod section 16 is then raised relative to the rod section 15 (which remains seated against the B. M.) until the main target 29 registers with the H. I., at which time the lower "zero" end of the section 16 registers with the new grade G. During the entire grading procedure, the target 29 remains clamped to the rod section 16 at the 4.60' mark of the scale 25.

To set the new grade at a selected point A of the earthwork E, the rod is moved to this point and held in upright position with the lower end of the rod section 15 resting upon the upper end of a stake S down into the ground. Assuming that the ground at point A is somewhat higher than the grade G to be established, the main target 29 will be above the H. I. and this is immediately apparent to the engineer sighting the rod through the instrument I. The engineer or instrument man then signals the rodman that a cut is necessary at this point A, in other words that earth must be removed to bring the ground level down to the grade G.

Upon receiving such a signal, the rodman continues to maintain the rod in erect position and loosens the clamping screw 60 to allow downward sliding movement of the auxiliary target 50 along the rod section 15 from its normal inoperative setting adjacent the upper end of the rod section 15. The auxiliary target 50 is moved downwardly below the main target 29 until the instrument man signals that the auxiliary target is aligned with the H. I., at which time the rodman may clamp the auxiliary target to the rod section 15.

During this downward movement of the auxiliary target 50, the tape 45 is rotated around the rollers 42 and 43 so that the scale 48, which extends upwardly from this target, comes into view and the graduations of the scale are brought successively into register with the pointer or indicator 33 of the main target 29. After the auxiliary target 50 has been set at the H. I., the rodman notes the reading of the scale 48 as indicated by the pointer 33. This reading designates the vertical distance between the main and auxiliary targets, the reading thus representing the distance necessary to lower the main target 29 to the H. I. in order to locate the lower zero end of the rod section 16 at the new grade G. Consequently, in order to complete the grading procedure at the point A, it is only necessary for the rodman to observe the reading and then mark it upon the stake S, the marking thus indicating the depth of the cut of earth to be made below the upper end of the stake.

Reconsidering the typical example outlined above where the new grade G is located 4.60′ below the H. I., let us assume that the upper end of the stake S is disposed 3.10′ below the H. I. This means that the top of the stake S is 1.50′ above the desired grade G and that the main target 29 is likewise 1.50′ above the H. I. Consequently, where the auxiliary target 50, and the zero mark of the tape 45 are located on the H. I., the mark 1.50′ of the tape scale 48 is directly opposite the pointer 33 of the main target 29. Thus, the depth of cut (1.50′) is automatically indicated without requiring calculations of any kind on the part of either the instrument man or the rodman. Due to this fact, it is apparent that the setting of a grade for earthwork is greatly simplified and expedited and, since the rod is a precision instrument, the amount of cut is determined with great accuracy and the chance for human error is eliminated. As pointed out above, the main target 29, having once been set on the rod section 16, remains in this position throughout the setting of the grade over the entire "cut area" under consideration.

While the tape and auxiliary target have been referred to as a "cut" indicator means, this expedient may also have other uses. By using the main and auxiliary targets, it is possible for the engineer to establish two sets of grades simultaneously. For example, in street or highway work, the main target 29 may be set on the shoulder grade at, say, 4.50′ and assuming that the highway has a .67′ crown, the auxiliary target 50 is moved down the rod section 15 until the pointer on the main target registers with the .67′ mark on the tape 45, which is the grade rod setting for the center line of the road. The engineer is thus able to set the center line and shoulder grades without changing or resetting either target.

While I have herein shown and described the improved cut indicator rod as embodied in a preferred form of construction, by way of example, it will be apparent to those skilled in the art that various modifications might be made in the structure without departing from the spirit of the invention. Consequently, I do not wish to limit myself in this respect, but desire to be afforded the full scope of the appended claims.

I claim as my invention:

1. An engineering rod, comprising: a first vertical rod section; a second vertical rod section connected to and alongside said first section for vertical sliding movement relative thereto, said second rod section having a fixed grade-set scale extending longitudinally thereof; a main target adjustable longitudinally of said second section to register with the graduations of said scale, said target having a pointer thereon; a linear cut-indicator scale carried by said first rod section and movable longitudinally thereof relative to said main target and relative to said first rod section, said cut-indicator scale having graduations registrable with said pointer; and an auxiliary target carried by said cut-indicator scale with its horizontal center aligned with the zero mark thereof.

2. An engineering rod, comprising: a first vertical rod section; a second vertical rod section connected to and alongside said first section for vertical sliding movement relative thereto, said second rod section having a fixed grade-set scale extending longitudinally thereof; a main target adjustable longitudinally of said second section to register with the graduations of said scale, said target having a pointer thereon; a linear cut-indicator scale carried by said first rod section and movable longitudinally thereof relative to said main target and relative to said first rod section, said cut-indicator scale having graduations registrable with said pointer; an auxiliary target carried by said cut-indicator scale with its horizontal center aligned with the zero mark thereof; and clamping means on said auxiliary target engageable with said first rod section to retain said auxiliary target and said cut-indicator scale in selected positions of vertical adjustment relative to said first rod section.

3. An engineering rod, comprising: a first vertical rod section; a second vertical rod section connected to and alongside said first section for vertical sliding movement relative thereto, said second rod section having a fixed grade-set scale extending longitudinally thereof; a main target adjustable longitudinally of said second section to register with the graduations of said scale, said target having a pointer thereon; an endless cut-indicator tape rotatively mounted on said first rod section and having a portion of its length movable longitudinally of said first rod section, said portion having linear graduations registrable with said pointer; an auxiliary target carried by said cut-indicator tape with its horizontal center aligned with the zero mark thereof; and clamping means on said auxiliary target engageable with said first rod section to retain said auxiliary target and said cut-indicator tape in selected positions of vertical adjustment relative to said first rod section.

4. An engineering rod, comprising: a first rod section having a longitudinal groove in the front face thereof; a second rod section connected to and alongside said first rod section for vertical sliding movement relative thereto, said second rod section having a fixed grade-set scale extending longitudinally thereof along its corresponding front face; a main target adjustable longitudinally of said second rod section to register with the graduations of said scale, said target having a pointer at its horizontal center; rollers rotatably mounted within said groove adjacent the upper and lower ends of said first rod section; an endless cut-indicator tape disposed in said groove and rotatable around said rollers, said endless tape having a portion of its length movable longitudinally of said first rod section and provided with a linear cut-indicator scale, the graduations of which are registrable with said pointer; an auxiliary target fixedly connected to said portion with its horizontal center aligned with the zero mark of said cut-indicator scale; and clamping means on said auxiliary target engageable with said first rod section to retain said auxiliary target in selected positions of vertical adjustment relative to said first rod section.

5. An engineering rod, comprising: a first rod section having a longitudinal groove in the front face thereof; a second rod section connected to and alongside said first rod section for vertical sliding movement relative thereto, said second rod section having a fixed grade-set scale extending longitudinally thereof along its corresponding front face; a main target adjustable longitudinally of said second rod section to register with the graduations of said scale, said target having a pointer at its horizontal center; rollers rotatably mounted within said groove adjacent the upper and lower ends of said first rod section; an endless cut-indicator tape disposed in said groove and rotatable around said rollers, said endless tape having a portion of its length movable longitudinally of said first rod section and provided with a linear cut-indicator scale, the graduations of which are registrable with said pointer; an auxiliary target fixedly connected to said portion with its horizontal center aligned with the zero mark of said cut-indicator scale, said auxiliary target being of different configuration than said main target; and clamping means on said auxiliary target engageable with said first rod section to retain said auxiliary target in selected positions of vertical adjustment relative to said first rod section.

6. An engineering rod, comprising: a first rod section having a longitudinal groove in the front face thereof; a second rod section connected to and alongside said first rod section for vertical sliding movement relative thereto, said second rod section having a fixed grade-set scale extending longitudinally thereof along its corresponding front face; a main target adjustable longitudinally of said second rod section to register with the graduations of said scale, said target having a pointer at its horizontal center; rollers rotatably mounted within said groove adjacent the upper and lower ends of said first rod section; an endless cut-indicator tape disposed in said groove and rotatable around said rollers, said endless tape having a portion of its length movable longitudinally of said first rod section and provided with a linear cut-indicator scale, the graduations of which are registrable with said pointer; an auxiliary target fixedly connected to said portion with its horizontal center aligned with the zero mark of said cut-indicator scale; clamping means on said auxiliary target engageable with said first rod section to retain said auxiliary target in selected positions of vertical adjustment relative to said first rod section; and means for adjusting one of said rollers toward and away from the other roller to adjust the tension of said tape.

References Cited in the file of this patent
UNITED STATES PATENTS 1,063,447     Hollingsworth _____ June 3, 1913